UNITED STATES PATENT OFFICE.

LONNIE W. RYAN, OF CHICAGO, ILLINOIS, ASSIGNOR TO LINDSAY LIGHT COMPANY, OF CHICAGO, ILLINOIS, A CORPORATION OF ILLINOIS.

RECOVERY OF THORIUM.

1,351,489.  Specification of Letters Patent.  Patented Aug. 31, 1920.

No Drawing.  Application filed May 29, 1918.  Serial No. 237,328.

*To all whom it may concern:*

Be it known that I, LONNIE W. RYAN, a citizen of the United States, residing at Chicago, in the county of Cook and State of Illinois, have invented a new and useful Improvement in the Recovery of Thorium, of which the following is a specification.

My present invention relates to the recovery of thorium and will be fully understood from the following specification. It has been discovered that thorium may be selectively precipitated from solutions containing rare earths and other elements by means of metaphosphoric acid or a soluble metaphosphate such as sodium metaphosphate. Thorium, titanium, zirconium and the rare earths are precipitated from an acid solution by metaphosphoric acid or a soluble metaphosphate.

Ferric iron is precipitated only if the solution is hot, while ferrous iron is not precipitated by these precipitants.

I have discovered that by using the proper percentage of precipitant, thorium may be precipitated practically quantitatively and at the same time separated from the bulk of the rare earth metals and iron.

If one adds to an acid solution containing thorium, titanium, zirconium, iron and rare earth metals, an amount of metaphosphoric acid or soluble metaphosphate sufficient to convert all of the thorium, titanium, zirconium, iron and rare earth metals into metaphosphates, then all these elements except the iron will be precipitated together as metaphosphates. However, if to an acid solution containing the above elements one adds metaphosphoric acid or a soluble metaphosphate, in amount approximately sufficient to convert the thorium, titanium and zirconium into metaphosphates then a precipitate will be formed which consists substantially of the metaphosphate of thorium, titanium, and zirconium, while substantially all of the iron and rare earth metals remain in solution. Working in this way it is possible to effect a separation of practically all of the thorium from the admixed iron and rare earth metals. The precipitation may be effected either in hot or cold solutions and the acidity of the solution may vary through a wide range (at least .3 to 2 normal). It should be noted, however, that ferric iron will be brought down in hot solutions, and for this reason as well as to prevent rare earth phosphates and sulfates from coming down, $PO_4$ and $SO_4$ ions being present in substantial amount, it is better to employ cold solutions.

I have also discovered that metaphosphates of thorium, titanium, zirconium, iron and rare earth metals, which are insoluble in water and dilute acids dissolve readily in excess of a solution of the acid or of a soluble metaphosphate. This solvent power of metaphosphoric acid or soluble metaphosphate may be utilized in a practical process to again bring into solution the thorium metaphosphates following the selective precipitation of the latter.

Thorium metaphosphate is soluble in sodium carbonate and sodium bi-carbonate, and in a mixture of the two. The metaphosphates of rare earth metals, iron, zirconium, and titanium are not soluble in these compounds. A metaphosphate precipitate from a thorium solution may therefore be treated in this way to separate the thorium from any of the above impurities which may be present.

The recovery of thorium from monazite sands in accordance with my present invention may be effected in the following manner:

500 pounds of India monazite sand having a thorium content calculated as thorium oxid of approximately 9 per cent. is heated with about 750 pounds of sulfuric acid, under constant stirring, for about 4 to 8 hours, the temperature of the mass being maintained at approximately 200–300° C. At the end of this operation the sand should be completely attacked, and converted into soluble form. The product produced by the action of $H_2SO_4$ and sand is now introduced into 1000 gallons of cold water. In general, this will not give a clear solution, some small proportion of the thorium and other metals present precipitating, apparently as ortho-phosphates. 68 pounds of sodium metaphosphate is now added. Substantially all of the thorium present in the solution precipitates as a metaphosphate, while the bulk of the rare earth metals and the iron present remain in solution. The mass is now filtered and the filter cake after washing will contain the thorium content of the monazite sands in some form of metaphosphate admixed with only a small percentage of impurities which may be removed by subsequent treatment. As a preliminary to such subsequent treatment, I prefer to stir the filter cake with a 5 to 6 per cent. solution of sulfuric acid, by which treatment a portion of the rare earth metals and iron present are dissolved therefrom. I now convert the metaphosphate into an hydroxid by boiling with a concentrated solution of caustic soda. In this way the solid metaphosphate is changed directly to a solid hydroxid. The hydroxid may now be dealt with in accordance with the known methods.

As suggested in the foregoing, it is possible instead of converting the original or purified metaphosphate precipitate to an hydroxid to directly redissolve the metaphosphate in an excess of metaphosphoric acid or soluble metaphosphate, thus obtaining directly a solution of the purified thorium compound which may in some cases be handled more easily than the hydroxid.

It will be understood that the foregoing example is given by way of illustration only and for the purpose of making the invention more clear, and that the invention is not to be regarded as limited to the exact procedure described, except in so far as such limitations are included within the terms of the appended claims in which it is my intention to claim all novelty inherent in the invention as broadly as is permissible in view of the prior art.

What I claim is—

1. The step in the method of separating thorium from rare earth metals which consists in reacting upon the compound of thorium in the presence of the rare earth metals with a metaphosphate, thereby forming a thorium metaphosphate under conditions preventing a similar conversion of the rare earth metals.

2. In the recovery of thorium, the step which consists in precipitating a dissolved thorium salt from a solution as a metaphosphate.

3. In the recovery of thorium from monazite sands, the purification step which consists in precipitating a soluble thorium salt as a metaphosphate.

4. The method of separating thorium from a solution containing the same together with rare earth metals, which consists in selectively precipitating the thorium as a metaphosphate.

5. The method of recovering thorium from an acid solution carrying the thorium and rare earth metals, which consists in precipitating the thorium selectively as a metaphosphate.

6. The method of recovering thorium from an acid solution carrying thorium, rare earth metals and iron, which consists in precipitating the thorium selectively as a metaphosphate.

7. The method of recovering thorium from monazite sands, which consists in heating the said sands with sulfuric acid to effect decomposition of the same, bringing the mass into solution and selectively precipitating the thorium as a metaphosphate.

8. The method of recovering thorium from sands containing same, which consists in baking the said sands with sulfuric acid to effect decomposition thereof, bringing the mass into solution, selectively precipitating the thorium present as a metaphosphate, and directly converting the thorium metaphosphate into thorium hydroxid.

9. The method of recovering thorium which consists in selectively precipitating thorium as a metaphosphate from an acid solution carrying the thorium and rare earth metals, and converting the metaphosphate precipitate into an hydroxid.

10. The method of recovering thorium from an acid solution carrying the thorium and rare earth metals, which consists in precipitating the thorium selectively as a metaphosphate, dissolving out impurities in the precipitate with dilute sulfuric acid and converting the purified metaphosphate precipitate into an hydroxid.

LONNIE W. RYAN.